United States Patent [19]

Kawai et al.

[11] Patent Number: 4,773,613
[45] Date of Patent: Sep. 27, 1988

[54] EMERGENCY LOCK RETRACTOR EQUIPPED WITH WEBBING CLAMP DEVICE

[75] Inventors: Osamu Kawai; Kazumi Hirata; Hiroshi Kainuma, all of Fujisawa, Japan

[73] Assignee: Nippon Seiko Kabushiki Kaisha, Tokyo, Japan

[21] Appl. No.: 928,347

[22] Filed: Nov. 10, 1986

Related U.S. Application Data

[60] Continuation-in-part of Ser. No. 854,907, Apr. 23, 1986, abandoned, which is a division of Ser. No. 745,520, Jun. 17, 1985, abandoned.

[30] Foreign Application Priority Data

Jul. 2, 1984 [JP] Japan ................................. 59-98429

[51] Int. Cl.⁴ ..................... B60R 22/38; B60R 22/40; B60R 22/42
[52] U.S. Cl. .................... 242/107.2; 242/107.4 A; 242/107.4 B; 280/806
[58] Field of Search .............. 242/107.2, 107.4 A, 242/107.4 B, 107.4 D, 107.4 R; 280/806, 803; 297/478, 480; 180/268, 270

[56] References Cited

U.S. PATENT DOCUMENTS

| 3,876,031 | 4/1975 | Stouffer . | |
|---|---|---|---|
| 4,007,802 | 2/1977 | de Rosa . | |
| 4,036,322 | 7/1977 | Takada | 242/107.4 B X |
| 4,090,735 | 5/1978 | Czernakowski . | |
| 4,181,326 | 1/1980 | Hollowell et al. | 280/806 |
| 4,209,186 | 6/1980 | Close | 280/803 |
| 4,235,455 | 11/1980 | Collins et al. | 280/803 |
| 4,251,091 | 2/1981 | Weissner et al. | 242/107.4 A X |
| 4,302,030 | 11/1981 | Clay | 280/802 |
| 4,321,979 | 3/1982 | Kuroyama et al. | 242/107.4 A X |
| 4,564,155 | 1/1986 | Tsukamoto | 242/107.4 A |

FOREIGN PATENT DOCUMENTS

61-14155 1/1986 Japan .

Primary Examiner—John M. Jillions
Attorney, Agent, or Firm—Wegner & Bretschneider

[57] ABSTRACT

An emergency lock retractor equipped with a webbing clamp device includes means for holding lock means such as an arm out of engagement with a take-up reel while detection means detects that the associated webbing is not worn by the occupant. The above emergency lock retractor can provide a highly-reliable seat belt system free of the end locking problem, because its emergency lock mechanism is kept inoperative while no emergency locking is required.

13 Claims, 10 Drawing Sheets

EMERGENCY LOCK RETRACTOR EQUIPPED WITH WEBBING CLAMP DEVICE

BACKGROUND OF THE INVENTION

This application is a Continuation-In-Part of Ser. No. 854,907, filed Apr. 23, 1986, now abandoned, which in turn is a divisional of Ser. No. 745,520, now abandoned, filed June 17, 1985.

(1) Field of the Invention

This invention relates to an emergency lock retractor equipped with a webbing clamp device, which has such a function that its emergency lock mechanism is held inoperative while no emergency locking is required.

(2) Description of the Prior Art

An emergency lock retractor serves to detect a sudden speed change of its associated vehicle or a sudden release of its webbing to prevent any further rotation of its take-up spindle, thereby preventing any further release of the webbing. Even with this emergency lock retractor, the webbing is tightened up further when a still stronger tensile force is applied to the webbing owing to the inertia of the occupant subsequent to the actuation of its locking mechanism in the event of an emergency. The webbing is thus allowed to extend forward together with the occupant, leading to a failure in safely restraining the occupant.

With a view toward overcoming such a problem, emergency lock retractors equipped with webbing clamp devices have been proposed. According to an emergency lock retractor equipped with a webbing clamp device, its webbing is held by a clamp device subsequent to actuation of its emergency lock mechanism so as to exert a brake force against movement of the webbing in the webbing releasing direction, whereby to prevent any further release of the webbing which otherwise takes place due to tightening of the webbing.

In the above-mentioned emergency lock retractor equipped with such a webbing clamp device, the webbing is rapidly taken up on a take-up reel owing to the biasing force of a take-up spring when the occupant has stopped using the seat belt and released the webbing from his hand. Here, the take-up reel may be caused to over-rotate beyond the prescribed winding end position due to the inertia. When the emergency lock mechanism has been actuated by a vibration of its associated vehicle or the like in such an over-rotated state, for example, when a sensor arm has been caused to swing into engagement with a ratchet gear mounted fixedly on a take-up spindle, the take-up reel starts backward rotation to the prescribed winding position. This backward rotation of the take-up reel urges the ratchet gear and sensor arm in such a way that they maintain their engagement (in other words, in the webbing releasing direction), thereby freezing the emergency lock state (this state will hereinafter be called "the end lock state").

In the case of an emergency lock retractor equipped with no webbing clamp device, the wound webbing is tightened and is thus released when the webbing is pulled by a large force. By winding back the thus-released webbing, the take-up spindle is allowed to rotate in the winding direction. It is therefore possible to release the emergency lock mechanism from the end lock state. It is however impossible to release an emergency lock retractor equipped with a webbing clamp device from the end lock state, because owing to the provision of the webbing clamp device preventing the tightening of the wound webbing subsequent to its emergency locking, the webbing clamp device is actuated to hold and lock the webbing when the webbing is pulled strongly subsequent to the development of the end lock state and it is thus unable to tighten the wound webbing and to wind back the webbing over a length equivalent to the length released by its tightening. Once the emergency lock retractor equipped with the webbing clamp device has been brought into the end lock state, it becomes absolutely impossible to pull out the webbing and unless the webbing clamp device is provided with a mechanism capable of forcedly releasing the clamping of the webbing clamp device, the seat belt system thus becomes no longer usable.

SUMMARY OF THE INVENTION

An object of this invention is to solve the end locking problem in emergency lock retractors equipped with webbing clamp devices and hence to provide a seat belt system having higher reliability.

In one aspect of this invention, there is thus provided an emergency lock retractor equipped with a webbing clamp device, which comprises:

a base;

a webbing take-up reel supported rotatably on the base, carrying a webbing wound up releasably thereon, and biased in the webbing winding direction;

lock means displaceable between a first state, in which said lock means permits rotation of the take-up reel in the webbing releasing direction, and a second state in which upon detection of a speed change of a predetermined value or greater applied to the base, said lock means prevents rotation of the take-up reel in the webbing releasing direction;

brake means for exerting a brake force against movement of the webbing in the webbing releasing direction upon detection of a tensile force of a preset value or greater applied to the webbing when the webbing is pulled out further after displacement of the lock means into the second state;

detection means for determining whether the webbing is worn by an occupant or not; and latch-preventing means for holding said lock means in the first state while said detection means detects that the webbing is not worn by the occupant.

The subject emergency lock retractor equipped with the webbing clamp device can provide a highly-reliable seat belt system free of the end locking problem, because its emergency lock mechanism is kept inoperative without relying upon the webbing while no emergency locking is required.

The above and other objects, features and advantages of the present invention will become apparent from the following description and the appended claims, taken in conjunction with the accompanying drawings.

BRIEF DESCRIPTION OF THE DRAWINGS

In the accompanying drawings

FIG. 13 through FIG. 16 illustrate the details of the arm of the fifth embodiment; namely.

DETAILED DESCRIPTION OF THE INVENTION AND PREFERRED EMBODIMENTS

Figure 1:
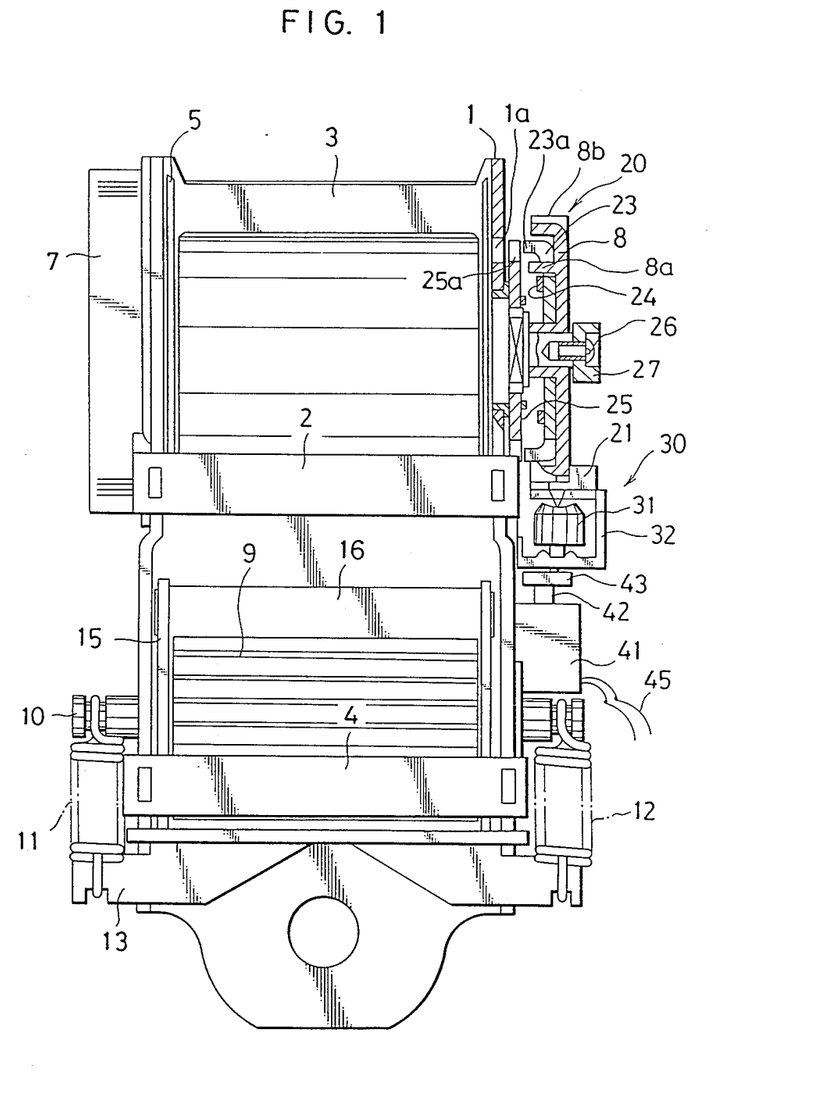
FIG. 1 is a partly cross-sectional, front elevation of an emergency lock retractor equipped with a webbing clamp device, according to the first embodiment of this invention.
Figure 2:
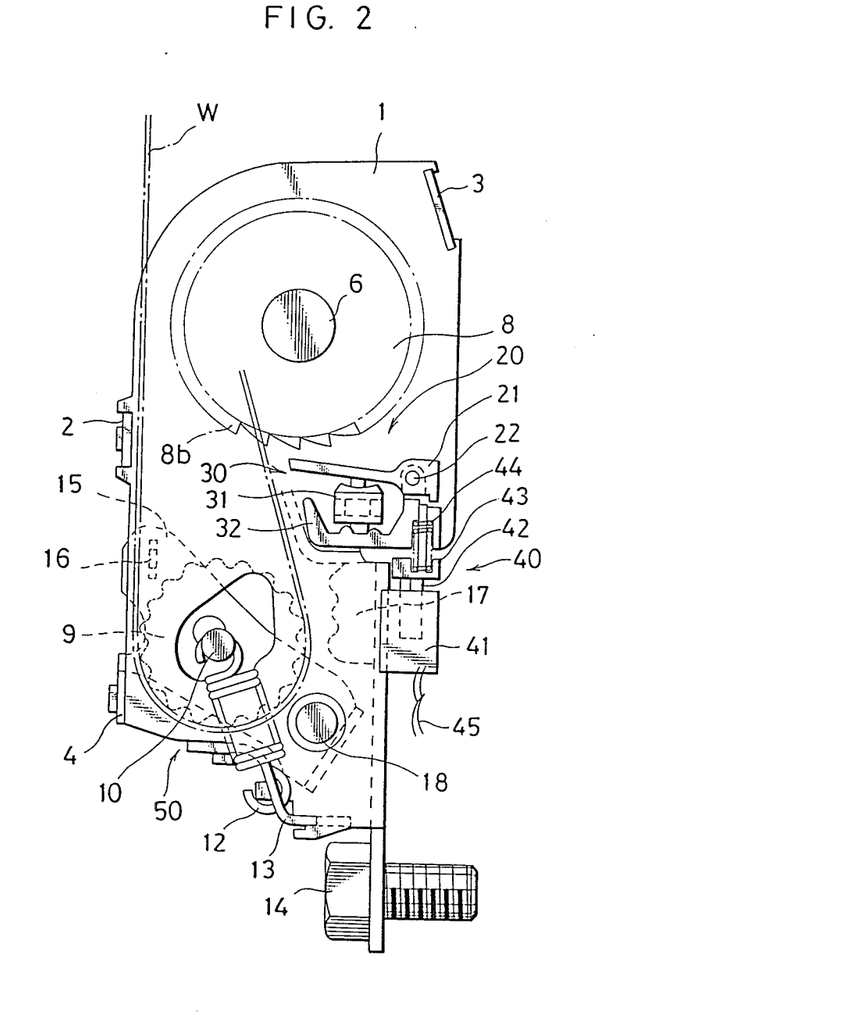
FIG. 2 is a side elevation of the retractor of FIG. 1.

In the first embodiment depicted in FIGS. 1 and 2, a base 1 has a rear wall, which is adapted to mount the emergency lock retractor on a part of a vehicle, and side walls extending at right angles from the corresponding side edges of the rear wall. The base 1 is reinforced by bridges 2, 3, 4 and 13 which tie the two side walls. As will later be described in detail, the base 1 is provided with a variety of mechanisms and is then mounted on the vehicle by means of a bolt 14 which extends through an attachment bore formed through the rear wall at a point close to the lower edge of the rear wall.

Between the side walls of the base 1 and in an upper part of the base 1, a take-up spindle 6 of a take-up reel 5 on which a webbing W is fastened at one end thereof is rotatably supported. The inner end of an unillustrated spiral spring is coupled to one end of the take-up spindle 6. The one end of the take-up spindle 6 and the spiral spring are both covered by a cover 7, on which the outer end of the spiral spring is connected. Lock means 20 is arranged on the other end of the take-up spindle 6, whereby to prevent rotation of the take-up reel 5. The lock means 20 is composed of a weight 31 seated on a weight support 32 provided fixedly on the associated side wall of the base 1, an arm 21 arranged on the weight 31 and fitted swingably on a pin 22 fixed on the weight support 32, a ratchet wheel 8 provided on the take-up spindle 6 and engageable with the arm 21, latch wheel 23, a leaf spring 24, latch plate 25 and locking slots 1a bored through the associated side wall of the base 1.

The latch plate 25 rotates as a unitary member with the take-up spindle 6. The latch plate 25 is equipped, on the rim thereof, with a number of teeth 25a which extend out radially. Corresponding to the teeth 25a, a number of locking slots 1a are bored through the associated side wall of the base 1 with an angular interval equal to that of the teeth 25a. Outside the latch plate 25, the latch wheel 23 which is biased outwards by the leaf spring 24 is loose-fit on the take-up spindle 6 in contact with the ratchet wheel 8 provided still outside. The leaf spring 24 is at one portion thereof in engagement with the latch plate 25 and at another portion thereof in engagement with the latch wheel 23 so that the latch wheel 23 can be rotated together with the latch plate 25, namely, with the take-up spindle 6. The latch wheel 23 is equipped with teeth 23a which extend out from the rim of the latch wheel 23 toward the teeth 25a of the latch plate 25, so that the teeth 23a can be allowed to enter the spacings between the teeth 25a. However, the teeth 23a are normally kept out of engagement with the teeth 25a because the latch wheel 23 is normally urged outward by the leaf spring 24. In close contact with the latch wheel 23 and outside the latch wheel 23, the ratchet wheel 8 is loose-fit on the end portion of the take-up spindle 6. The ratchet wheel 8 is prevented from moving outward along the axis of the take-up spindle 6 owing to the provision of a stopper 27 secured fixedly to the take-up spindle 6 by a self-tapping screw 26. The ratchet wheel 8 is of a flattened cylindrical shape with a cavity defined inside, and has a cam face 8a extending inward in the cavity. Therefore, the cam face 8a makes up a cam arrangement in combination with a part of the latch wheel 23. When the latch wheel 23 and ratchet wheel 8 rotate relative to each other, the latch wheel 23 is pushed toward the latch plate 25 against the biasing force of the leaf spring 24 by the cam face 8a of the ratchet wheel 8 so that the teeth 23a advance into the spacings between the teeth 25a of the latch plate 25 and further into the locking slots 1a bored through the associated side wall of the base 1. Here, the take-up spindle 6 is fixed relative to the base 1 by way of the latch plate 25 and is thus kept in a locked state in which the take-up spindle 6 cannot rotate. On the other hand, the ratchet wheel 8 has a number of teeth 8b on its rim. When the arm 21 assumes its first position in which the arm 21 has swung upward, the tip of the arm 21 is allowed to engage either one of the teeth 8b. Owing to this engagement, rotation of the ratchet wheel 8 is prevented. When a force is applied to the webbing for its further release, the latch wheel 23 which rotates together with the take-up spindle 6 is caused to rotate relative to the ratchet wheel 8 so that the take-up spindle 6 is brought into the above-mentioned locked state.

The above-mentioned swinging motion of the arm 21 is controlled by a sensor 30 which serves as arm control means. The sensor 30 is composed of the weight 31, on which the projection formed on the arm 21 at the longitudinal midpoint thereof rests, and the weight support 32 enclosing the weight 31 therein. The weight 31 is tilted from its upright position within the weight support 32 by a sudden change in vehicle speed, namely, in the speed applied to the base 1. By this tilting motion, the arm 21 is caused to swing from its second position shown in FIG. 2 to its first position where the arm 21 is brought into engagement with either one of the teeth 8b of the ratchet wheel 8.

Below the take-up reel 5, webbing clamp means 50 is provided as brake means. After preventing rotation of the take-up reel 5, the webbing clamp means 50 detects a tensile force exerted to the webbing W and clamps the webbing W so as to prevent any further release of the webbing W. A swing arm 15 is composed of a square U-shaped frame, which is swingably mounted on a shaft 18 provided between the side walls of the base 1 and includes side plates, and a tie strip 16 connecting the side plates at their distal ends. A shaft 10 extends through slots bored respectively through the side plates of the swing arm 15 and also through holes formed respectively through the side walls of the base 1. Coil springs 11,12 are hooked at one ends thereof to their corresponding ends of the shaft 10. The other ends of the coil springs 11,12 are hooked to the bridge 13 fixed on a lower part of the base 1, whereby normally biasing the shaft 10 downwards, namely, to the lower edges of the slots of the swing arm 15. On the shaft 10, a rotor 9 equipped with ridges defined by a plurality of grooves extending along the axis of the rotor 9 in the circumferential wall of the rotor 9 is rotatably fit. The rotor 9 is provided in such a way that either one of the ridges engages the tie strip 16 when the shaft 10 is located at the upper edges of the slots of the swing arm 15. On the other hand, a clamp block 17 is fixedly provided on the rear wall of the base 1 at a position corresponding to the rotor 9.

The webbing clamp means 50 is arranged with the above-described structure. After being paid out from the take-up reel 5, the webbing W is allowed to extend over substantially one half of the circumferential wall of the rotor 9 and is then guided upwards. When the lock means 20 has been actuated by the sensor 30 and the arm 21 has thus been brought into engagement with the ratchet wheel 8, no further release of the webbing W is feasible. The application of a further tension to the webbing W causes the rotor 9 to move upwardly in the swing arm 15 by a distance equal to the length from the lower edge of the slot in each side plate of the swing arm 15 to its upper edge. This movement brings one of the ridges of the rotor 9 into engagement with the tie strip 16, thereby preventing any further rotation of the rotor 9. The application of a subsequent tension to the webbing W causes the rotor 9 to swing together with the swing arm 15 toward the clamp block 17 about the shaft 18. Eventually, the rotor 9 and clamp block 17 are brought into mutual engagement so that they clamp the webbing W therebetween to prevent any further release of the webbing W.

The above structure is found in some conventionally-known emergency lock retractors equipped with webbing clamp devices. When the arm 21 is brought into engagement with the ratchet wheel 8 after the take-up reel 5 has been over-rotated upon winding back the webbing rapidly as mentioned above, the return force of the over-rotation freezes their engagement. As a result, any subsequent attempt to release the webbing W results in the activation of the clamp means 50, thereby making it impossible to release the webbing W any further.

The subject emergency lock retractor equipped with the webbing clamp device also includes latch-preventing means 40, which is brought into engagement with the arm 21, and detection means for determining whether the webbing W is worn by the occupant or not.

Figure 3:
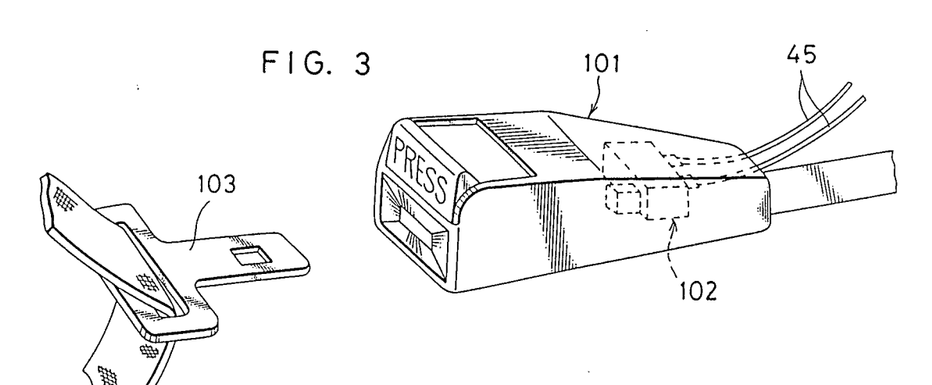
FIG. 3 is a perspective view of a buckle and its matching tang, which make up means for determining whether the webbing is worn by the occupant or not.
Figure 4:
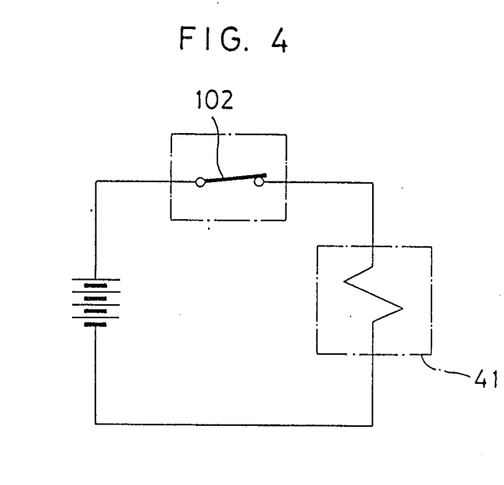
FIG. 4 is a circuit diagram of the determination means.

As mentioned above, FIG. 1 and FIG. 2 illustrates the first embodiment of this invention, in which the latch-preventing means 40 makes use of a solenoid 41. The solenoid 41 is fixed on the base 1 with a plunger 42 extending upward. The tip of the plunger 42 is kept in contact with the lower surface of a latch-preventing member 43. The latch-preventing member 43 has a projection which extends upright from a planar portion thereof. This projection extends into a hole formed through a part of the weight support 32. A coil spring 44 is provided between the latch-preventing member 43 and the weight support 32, whereby to bias normally the latch-preventing member 43 downwards. As shown in FIG. 3 and FIG. 4, the solenoid 41 is connected via lead wires 45 to a switch 102 which is provided within a buckle 101. As best illustrated in the circuit diagram of FIG. 4, the supply of a current to the solenoid 41 is cut when the tang 103 is fastened to the buckle 101. When the tang 103 and buckle 101 are disengaged, the current is fed to the solenoid 41. The buckle 101, switch 102 and tang 103 make up the above-mentioned detection means for determining whether the webbing W is worn by the occupant or not. Accordingly, when the seat belt system is not worn, energization of the solenoid 41 causes the plunger 42 to extend out from the solenoid 41 so that the latch-preventing member 43 is lifted upward against the biasing force of the coil spring 44. At this time, the tip of the latch-preventing member 43 projects out from the weight support 32 into contact with a rear end portion of the arm 21. When the solenoid is de-energized by wearing the seat belt system, the plunger 42 is caused to return into the solenoid 41 and the tip of the latch-preventing member 43 is pulled back by the spring 44 into the weight support 32.

The operation of the first embodiment of this invention, which has the above-described structure, will next be described.

When the occupant fastens the tang 103 to the buckle 101 to wear the seat belt system, the solenoid 41 is de-energized and the plunger 42 is hence retreated into the solenoid 41 as mentioned above. Accordingly, the tip of its associating latch-preventing member 43 is also retreated into the weight support 32. In this state, the emergency lock retractor of the first embodiment operates in the same manner as conventional emergency lock retractors equipped with webbing clamp devices. When the engagement between the tang 103 and buckle 101 is released by the occupant, the solenoid 41 is energized and the plunger 42 and latch-preventing member 43 are both caused to extend out so that the latch-preventing member 43 is brought at its tip into contact with the arm 21. In this state, the arm is prevented from swinging about the pin 22 and is thus held at the second position. Therefore, the arm 21 is not allowed to undergo any swinging motion even when the sensor 30 detects a sudden change in speed of the vehicle. The arm 21 is thus kept out of engagement with the ratchet wheel 8, thereby successfully avoiding their end locking.

It may also be feasible to reverse the energization and de-energization of the solenoid 41 to energize it by engagement of the tang 103 with the buckle 101 and to de-energize the same by their disengagement. In this case, it is necessary to construct the plunger 41 in such a way that it is caused to extend out by de-energization and it is attracted by energization.

Figure 5:
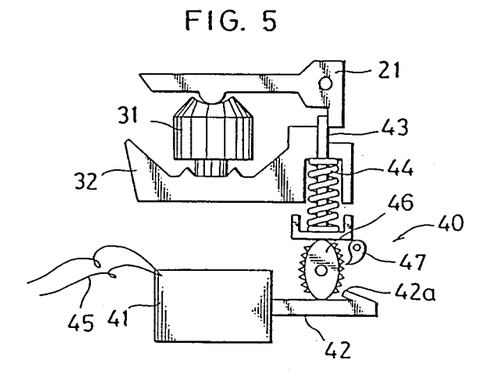
FIG. 5 is a fragmentary side view of an emergency lock retractor equipped with a webbing clamp device, according to the second embodiment of this invention.

FIG. 5 illustrates the second embodiment of the latch-preventing means 40, in which a solenoid is also employed. In this embodiment, a solenoid 41 and a cam 46 are combined and the structures other than the latch-preventing means 40 are the same as their corresponding structures in the first embodiment.

The solenoid 41 is fixed on the base 1 with its longitudinal axis extending in the horizontal direction. A plunger 42 extends out from the solenoid 41 and is defines a hook 42a at its free end portion. The solenoid 41 is connected by way of lead wires 45 to a circuit, in which the tang 103 and buckle 101 are used as a switch. The solenoid is connected to the circuit and is turned on for a pre-determined period of time whenever the tang 103 and buckle 101 are either engaged or disengaged, so that the plunger 42 is attracted. Two possible embodiments of the circuit are shown in FIGS. 17 and 18.

Figure 17:
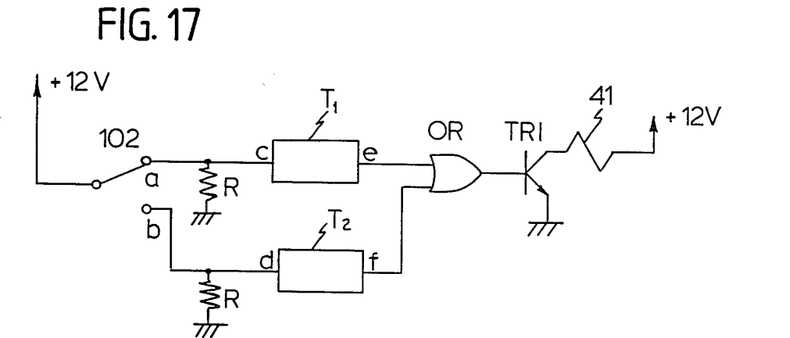
FIG. 17 is a circuit diagram of an activation circuit of the second embodiment of the invention.
Figure 18:
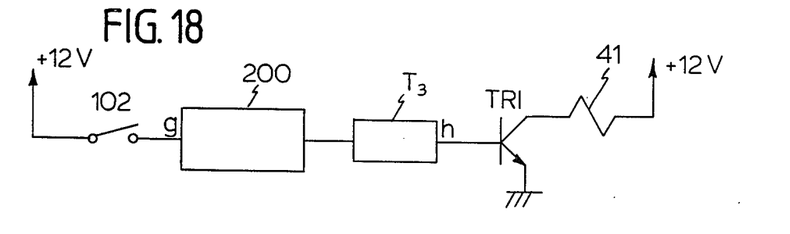
FIG. 18 is a circuit diagram of a second activation circuit for the second embodiment of the invention.

In FIG. 17, numeral 102 indicates a switch for detecting whether the tang 103 is latched on the buckle 101 (see FIG. 3). The switch 102 has two terminals a,b and the switching lever of the switch 102 is connected to the terminal a while the tang 103 and buckle 101 are latched but otherwise to the terminal b.

Each of timers $T_1$, $T_2$ is of such a type that generates an output at the rise time of an input signal but upon a lapse of a predetermined time period, stops the generation of the output irrespective of the level of the input signal. While the switching lever is not connected to the terminal a or b, the terminal c or d of the corresponding timer $T_1$ or $T_2$ remain at "0" level and as a consequence, the corresponding output terminal e or f also remains at "0" level. Let's now assume that the tang 103 and buckle 101 have been unlatched and the switching lever has been switched over to the terminal b. Then, the potential of the terminal d jumps up to +12 V. At the rise time of the potential at the terminal d, the timer $T_2$ is started and the terminal f is hence maintained at "H" level for a predetermined period of time. The potential thus becomes at "H" level on the output side of an OR gate, whereby a transistor TR1 is turned on to feed the current to the solenoid 41.

Upon a lapse of the predetermined period of time, the timer $T_2$ is turned off and the potential of the output terminal f drops to "L" level. Hence, the transistor TR1 is turned off and the current is no longer fed to the solenoid 41. When the tang 103 and buckle 101 are latched, the circuit operates in the same manner as described above except that the timer $T_1$ is actuated.

It is also possible for the timers $T_1$, $T_2$ to be actuated at the fall time of the input signal. In such a case, the circuit would operate in the same manner, except that timer $T_1$ would give an output signal for a pre-determined period of time upon unlatching of the tang 103 and buckle 101, and timer $T_2$ would provide the output signal upon latching.

Reference is next had to FIG. 18. In this embodiment, switch 102 is a switch which normally remains in its off position but is turned on when the tang 103 and buckle 101 are latched.

Designated at numeral 200 is a rise time/fall time detection circuit, which detects each rise time or fall time at a terminal g to generate one pulse per detection.

A timer $T_3$ is actuated at the rise time or fall time of the pulse, whereby a terminal h is maintained at "H" level for a pre-determined period of time. Accordingly, a transistor $TR_1$ is turned on to feed the current to the solenoid 41 upon each latching or unlatching of the tang 103 and buckle 101.

Above the plunger 42, a cam 46 having an elliptical shape equipped with a plurality of teeth on its rim portions corresponding to the minor axis thereof is provided rotatably on the base. A click 47 is arranged pivotally on a pivot fixed on the base. The click 47 allows the cam 46 to rotate in the clockwise direction (as viewed on FIG. 5) but prevents counterclockwise rotation of the cam 46 by its engagement with either one of the teeth provided on the rim of the cam 46. Above the cam 46, a latch-preventing member 43 is provided in contact with the circumferential cam face of the cam 46. Similar to the first embodiment, the latch-preventing member 43 has an upright member extending from its lower and planar portion and a coil spring 44 is arranged between the lower and planar portion and the weight support 32. Accordingly, the lower and planar portion is urged against the circumferential cam face of the cam 46. The tip portion of the upright member of the latch-preventing member 43 is kept within the weight support 32 while the cam 46 is kept, at one of its rim portions corresponding to its minor axis, in contact with the lower and planar portion. While the lower and planar portion is kept in contact, at one of its rim portions corresponding to its major axis, in contact with the lower and planar portion, the tip portion of the upright member of the latch-preventing member 43 extends out from the bore of the weight support 32 into engagement with the rear portion of the arm 21.

In the latch-preventing means 40 of the above-described second embodiment, the click 42a formed at the free end of the plunger 42 is brought into engagement with teeth provided on the rim of the cam 46 and causes the cam 46 to turn clockwise 90 degrees whenever the plunger 42 is attracted by the solenoid 41. When the tang 103 and buckle 101 are kept out of engagement, one of the rim portions corresponding to the major axis of the cam 46 is kept in contact with the lower and planar portion of the latch-preventing member 43 and the tip portion of the upright member of the latch-preventing member 43 is thus kept in contact with the arm 21. Accordingly, the arm is prevented from swinging. When the tang 103 and buckle 101 are fastened to each other, the cam 46 is turned over 90 degrees and one of its rim portions corresponding to its minor axis is brought into contact with the latch-preventing member 43. Thus, the upright member is lowered, so that the tip portion thereof does not protrude out of the weight support 32 and cannot engage the arm 21. Thereafter, the same operation is repeated.

Although the above description has been made on the embodiments in each of which the energization and de-energization of the solenoid are used to cause the latch-preventing member 43 to extend and retreat, the latch-preventing member 43 may alternatively be caused to undergo a displacement by transmitting a displacement of a member, which slides in accordance with the engagement or disengagement of the tang and buckle, mechanically by way of a wire cable or the like.

Figure 6:
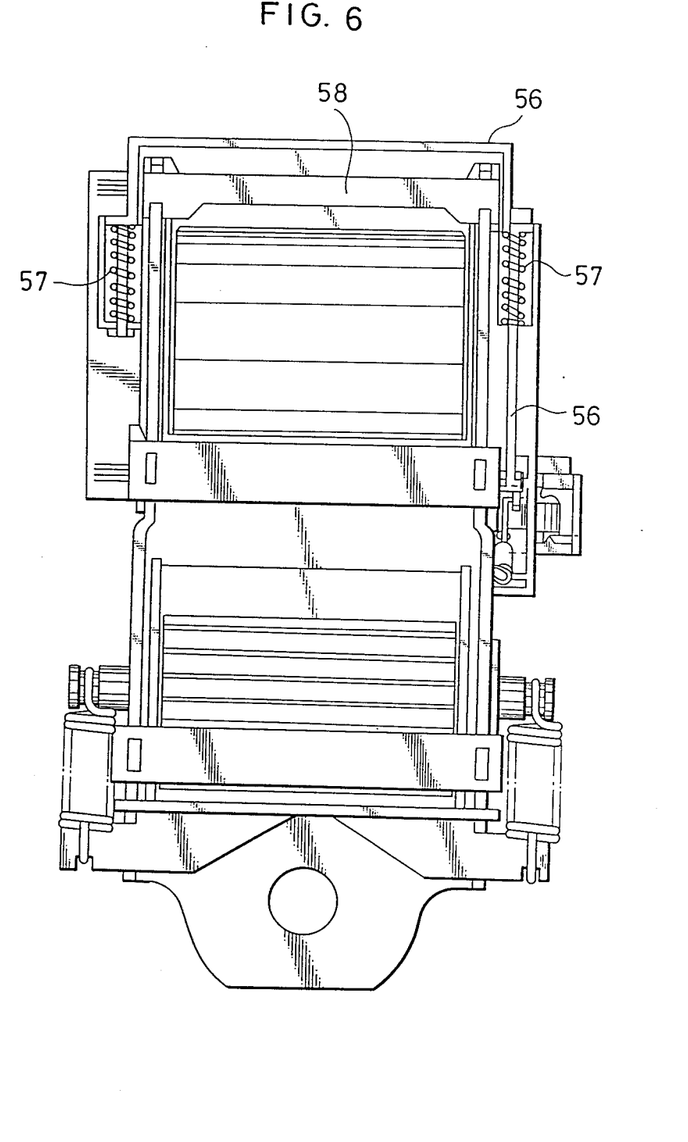
FIG. 6 is a front elevation of an emergency lock retractor equipped with a webbing clamp device, according to the third embodiment of this invention.
Figure 7:
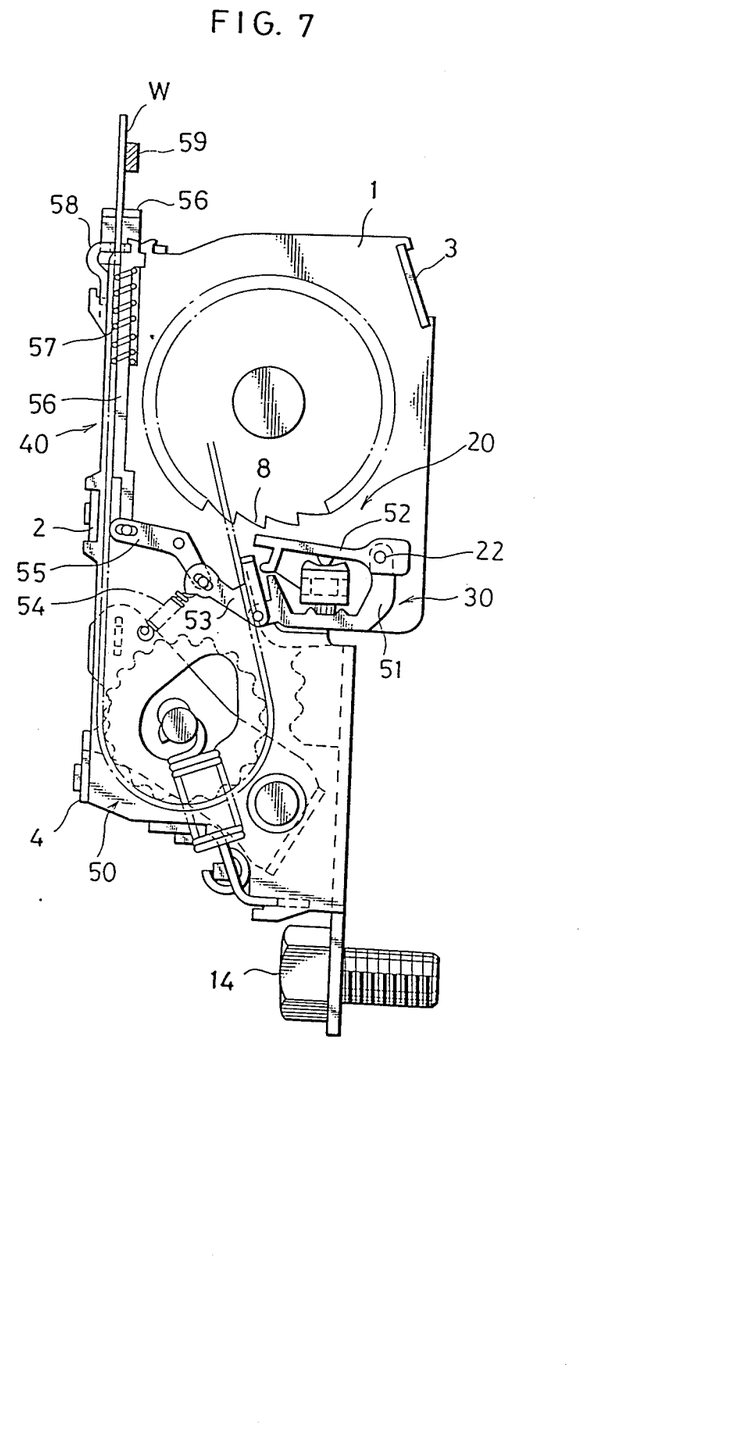
FIG. 7 is a side elevation of the retractor of FIG. 6.

Referring next to FIG. 6 and FIG. 7, a description will be made of the third embodiment in which an arm is prevented from its engagement with a ratchet wheel by sensing a point on the webbing W which point indicates that the webbing W has been taken up over a predetermined length thereof. Mechanisms other than the latch-preventing means 40 and detection means are substantially similar to their corresponding mechanisms in the first and second embodiments except for the shapes of an arm 52 and weight support 51.

The arm 52 is bifurcated at its front end portion. The straight front end portion is engageable with the teeth provided on the rim of the ratchet wheel 8, while the free end portion of the downward branch is arranged in opposition to the tip of a V-shaped latch-preventing lever 53 which is supported swingably on a tip portion of the weight support 51. Accordingly, the free end portion of the downward branch is brought into engagement with the tip of the latch-preventing lever 53 when the latch-preventing lever 53 is swung in the clockwise direction. The latch-preventing lever 53 is turnably held at a bottom portion thereof on the weight support 51 and has a tip at one end thereof. The other end of the latch-preventing lever 53 is coupled with one end of an opened V-like lever 55. One end of a coil spring 54 is hooked on the latch-preventing lever 53 at a point close to the point where the the lever 55 and lever 53 are connected together. Owing to the biasing force of the coil spring 54, the latch-preventing lever 53 is biased counterclockwise as viewed on FIG. 7. On the other hand, the other end of the lever 55 is coupled to the lower end of a link arm 56. The levers 53,55 and link arm 56 make up a link mechanism. Namely, a downward displacement of the link arm 56 causes the lever 55 to turn counterclockwise against the biasing force of the spring 54 and in addition, the latch-preventing lever 53 to turn clockwise. The link arm 56 includes a bridge portion defining a slit, through which the webbing W extends, and leg portions extending downwardly from the bridge portion. One of the leg portions, namely, the leg portion provided on the side where the lever 55 is provided has an extension which extends downwardly further and is coupled with one end of the lever 55. The other leg portion of the link arm 56 also has an extension. Both extensions extend into their corresponding spring compartments provided fixedly on the base 1. Owing to coil springs 57,57 fit over their corresponding extensions within the spring compartments, the link arm 56 is urged upwards. Below the bridge portion of the link arm 56, a bridge 58 is provided between the side walls of the base 1. Upon each downward displacement of the link arm 56, the bridge portion of the link arm 56 is brought into contact with the bridge 58, whereby preventing any further downward displacement of the link arm 56 and hence defining a lower limit for the link arm 56. The latch-preventing means is composed by the above-mentioned latch-preventing lever 53, lever 55 and link arm 56. On the webbing W, a stopper 59 which serves as the detection means is attached at a prescribed position. When the webbing W has been taken up beyond a predetermined length thereof, in other words, when the webbing is not worn by the occupant, the latch-preventing means prevents the arm 52 from swinging and the engagement between the arm 52 and the ratchet wheel 8 is thus prevented in a manner to be described below.

When the webbing W is taken up and the stopper 59 is brought into contact with the bridge portion of the link arm 56, the link arm 56 is then caused to undergo a downward displacement together with the webbing W until the bridge portion is brought into contact with the bridge 58. In the course of the downward displacement of the link arm 56, the lever 55 is turned counterclockwise as viewed on FIG. 7 as mentioned above whereas the latch-preventing lever 53 is turned clockwise. Therefore, the tip of the latch-preventing lever 53 is brought into engagement with the tip of the lower branch of the arm 52. By this engagement, the arm 52 is prevented from swinging and as a consequence, the engagement between the arm 52 and the ratchet wheel 8 is prevented. When the webbing W is pulled out, the engagement between the arm 52 and latch-preventing lever 53 is released in an manner opposite to that mentioned above.

Figure 8:
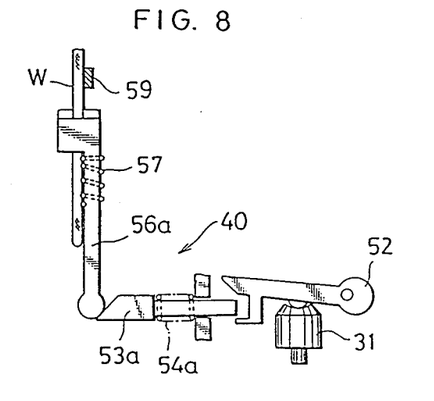
FIG. 8 is a fragmentary side view of an emergency lock retractor equipped with a webbing clamp device, according to the fourth embodiment of this invention.
Figure 9:
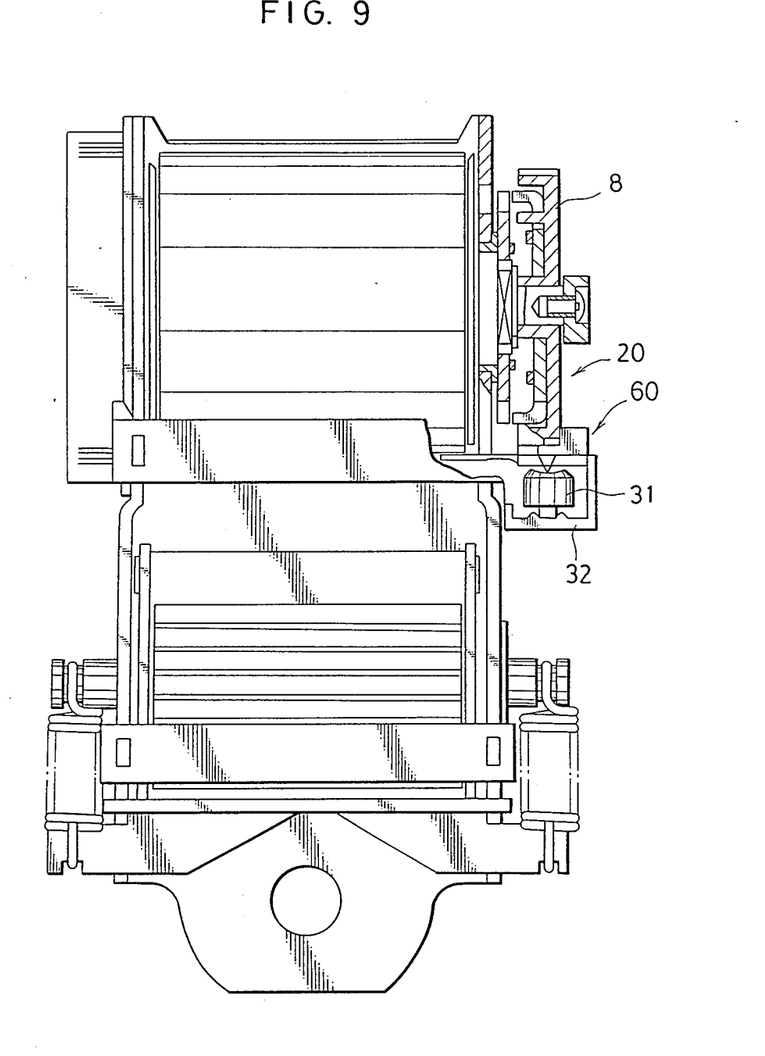
FIG. 9 is a partly cross-sectional, front elevation of an emergency lock retractor equipped with a webbing clamp device, according to the fifth embodiment of this invention.

With reference to FIG. 8, a description will next be made of the fourth embodiment in which similar to the third embodiment, there are provided a stopper attached to the webbing and latch-preventing means 40 of such a type that subsequent to engagement with the stopper, the latch-preventing means 40 is displaced to actuate the latch-preventing member.

The weight 31 and weight support (not shown) are the same as those of the first embodiment, while the arm 52 is substantially the same as its counterpart in the third embodiment. A latch-preventing lever 53a is held on the base 1 (not shown) in such a way that its rear end can move back and forth in opposition to the spacing between the two branches of the arm 52 and the latch-preventing lever 53a is normally biased by a spring 54a in a direction moving away from the arm 52. The other end, namely, the front end of the latch-preventing lever 53a defines a tilted surface, which makes up a cam arrangement in combination with a hemispherical lower end of an arm 56a. Except for the hemispherical lower end, the arm 56a is composed in the same way as the link arm 56 of the third embodiment. The arm 56a is urged normally upwards by a spring 57.

Similar to the third embodiment, the webbing W has a stopper 59 at a predetermined point. The stopper 59 is brought into contact with a slit of a bridge portion of the arm 56a. Thus, the stopper is allowed to undergo a prescribed downward displacement together with the arm 56a. Owing to this displacement, the hemispherical lower end wall of the arm 56a is caused to slide on the tilted surface and the latch-preventing lever 56a is hence caused to extend rightward as viewed on FIG. 8. Here, the rear end of the latch-preventing lever 53a enters the spacing between the bifurcated branches of the arm 52. Accordingly, the arm 52 is prevented from swinging, thereby making the emergency lock mechanism inoperative.

Finally, a description will be made with reference to FIG. 9 to FIG. 16 on latch-preventing means, which is capable of sensing the amount of the webbing W wound up on the take-up reel to prevent engagement between an arm and its associated ratchet wheel, and detection means.

Since this embodiment has the same structure as the first embodiment except for the latch-preventing means and detection means, a detailed description will hereinafter be made on the latch-preventing means and detection means only.

Figure 10:
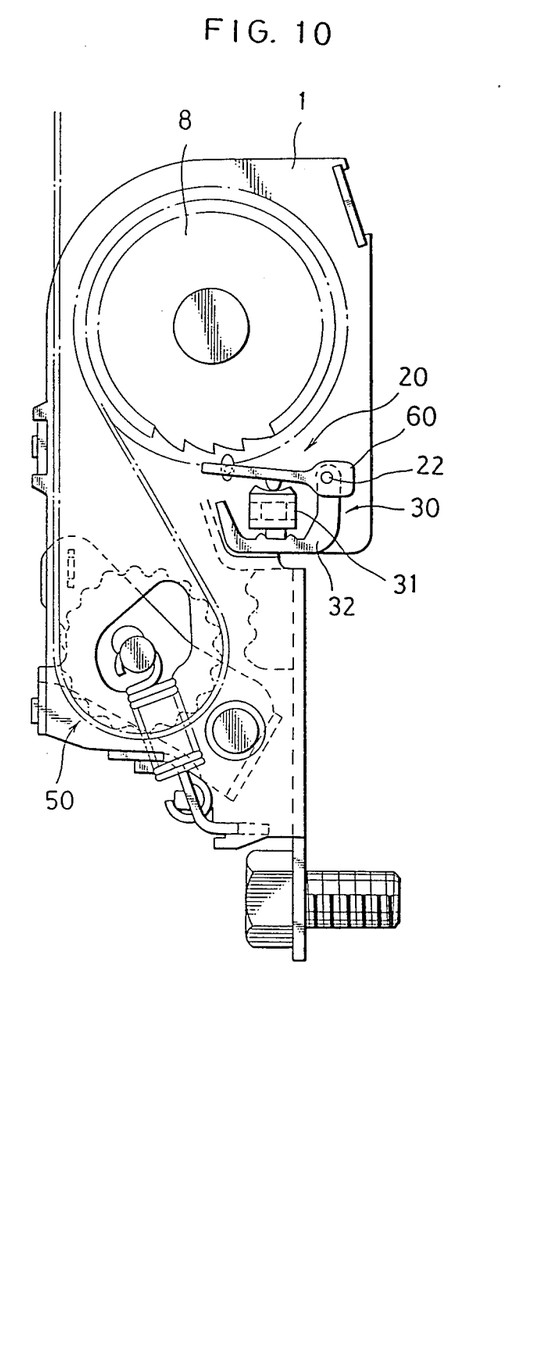
FIG. 10 is a side elevation of the retractor of FIG. 9.

The latch-preventing means and detection means are composed of an arm 60, which is swingably fit on a pin 22 provided on a weight support 32. The arm 60 is normally kept at a position where it is not engageable with any of the teeth of the ratchet wheel 8 as shown in FIG. 10. When the weight 31 of the sensor 30 has been tilted in the event of emergency, the tip of the arm 60 is caused to swing toward the teeth of the ratchet wheel 8.

Figure 13:
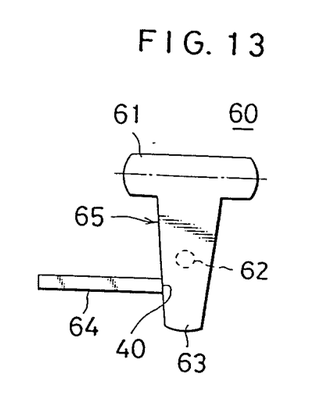
FIG. 13 is a top plan view of the arm.
Figure 14:
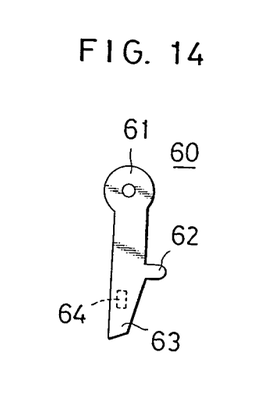
FIG. 14 is a side view of the arm.
Figure 15:
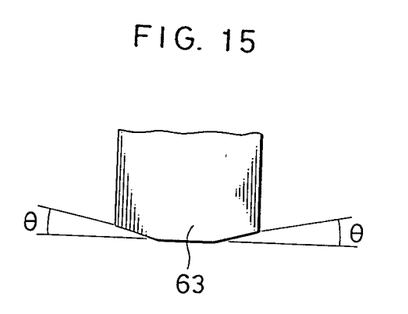
FIG. 15 is an enlarged top plan view of a tip portion of the arm.
Figure 16:
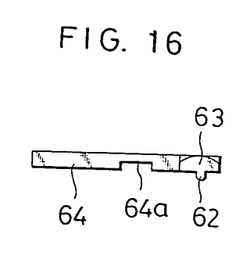
FIG. 16 is a front view of the arm.

As depicted in FIG. 13 through FIG. 15, the arm 60 is composed of an arm main body 65, which comprises a base portion 61, a controlling projection 62 kept in contact with the weight and a latch arm portion 63, a wound webbing diameter sensing member 64, and latch-preventing means 40 connecting the sensing member 64 as a unitary member to the arm main body 65. The base portion 61 is cylindrical and is fit on the shaft 22. The latch arm portion 63 extends out from the base portion 61 and its front end portion is formed as a click adapted to engage the teeth provided on the rim of the ratchet wheel 8. The click of the latch arm portion 63 is tapered when viewed on its side view as illustrated in FIG. 14, and is cut off at both tip corners thereof over a prescribed angle θ as viewed on its top plan view shown in FIG. 15. At a longitudinal midpoint of the latch arm portion 63, the controlling projection 62 is formed. The controlling projection 62 is fit in a recess formed in the upper surface of the weight 31, whereby to detect the swing of the weight 31. As shown in FIG. 13 and FIG. 14, the wound webbing diameter sensing member 64 extends out in the same direction as the base portion 61 from a point on the side wall of the latch arm 63, which point is adjacent to the tip of the latch arm 63, and is located outside the webbing taken up on the take-up reel 5 (see, FIG. 9). The wound webbing diameter sensing member 64 has a thin-walled portion 64a after it has extended out from the side wall of the latch arm portion 63. Thereafter, it extends out further with a greater thickness (see, FIG. 16). Owing to this thin-walled portion, resiliency has been imparted to the wound webbing diameter sensing member 64. When a torsional stress is applied relative to the latch arm portion 63 or a great stress is applied, the wound webbing diameter sensing member 64 can undergo an elastic deformation to cope with the stress without damaging any part of the arm 60.

The position of the wound webbing diameter sensing member 6 relative to the webbing W wound up on the reel is set as follows.

Figure 11:
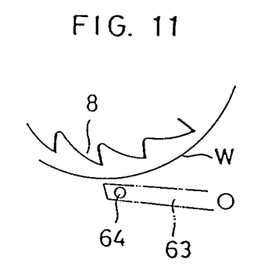
FIG. 11 and FIG. 12 schematically illustrate the relation between the arm and ratchet wheel in the fifth embodiment.

FIG. 11 corresponds to the normal state and shows the relationship between the arm 60 and ratchet wheel 8 when the weight 31 is not tilted, namely, when the sensor 30 is not in operation. The wound webbing diameter sensing member 64 is arranged in such a way that it does not contact the outermost layer of the webbing even when the webbing has been wound up to its maximum wound diameter. This arrangement has an advantageous effect that the arm 60 does not affect the winding capacity for the webbing, because the arm 60 and webbing W are kept out of engagement while the sensor 30 is not operated. When the wound webbing diameter sensing member 64 of the arm 60 is brought into contact with the webbing W, torsional stresses are normally applied to the arm 60 by weight of the member 64, the arm 60 may possibly undergo creep. If such creep takes place, the arm 60 may contact, for example, the weight support 32 and may thus not be moved smoothly when one tries to move the arm by the controlling means. The above creep may also cause such problems that that the tip of the arm 60 may be bent and hit the teeth of the ratchet wheel 8, thereby failing smooth engagement of the tip of the arm 60 with either one of the teeth of the ratchet wheel 8.

Figure 12:
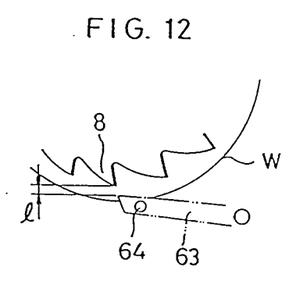

It is therefore preferred to keep the wound webbing diameter sensing member 64 out of contact with the webbing W. When the sensor 30 is activated and the weight 31 is tilted, the arm 60 is cause to swing toward the ratchet wheel 8. If the webbing W has been taken up at this stage beyond a predetermined length thereof, the wound webbing diameter sensing member 64 of the arm 60 is brought into contact with the outermost layer of the thus-wound webbing W. Since the wound webbing diameter sensing member 64 is connected with the arm main body 65 by way of the latch-preventing means 40, any further swinging motion of the arm 60 is prevented. Since a gap is still left between the teeth provided on the rim of the ratchet wheel 8 and the tip of the latch arm portion 63 of the arm 60, the ratchet wheel 8 and arm 60 are prevented from engagement, thereby avoiding the end locking problem.

Certain embodiments have been described above. It should however be borne in mind that various modifications or changes may be made thereto within the scope of this invention.

For example, the lock means described in the preferred embodiments all make use of the engagement of the ratchet wheel and arm to bring the teeth of the latch wheel into engagement with the locking slots of the base. Any lock means can however be employed, so long as it is such a type that at least either one of a member connected to the take-up spindle and a member connected to the base undergoes a displacement to engage the other member for the prevention of rotation of the take-up spindle and the displaceable one of the members is prevented from displacement by the latch-preventing member of this invention whenever necessary.

As a sensor for sensing each emergency state of a vehicle, one of sensors of such type that a sudden speed change of a vehicle is sensed has been shown by way of example. Sensors making use of other vehicle speed sensing methods may also be employed. It is also possible to use such a sensor that senses the releasing speed or acceleration of a webbing to displace an engagement member such as an arm or the like.

Webbing clamp devices of any type may also be used, including those having wedge-shaped members which slide in their corresponding frictional members to hold webbings therebetween in the event of emergency, and those merely preventing rotation of rotors to avoid any further release of webbings owing to friction between the rotors and webbings, etc.

Having now fully described the invention, it will be apparent to one of ordinary skill in the art that many changes and modifications can be made thereto without departing from the spirit or scope of the invention as set forth herein.

What is claimed is:

1. An emergency lock retractor comprising:
   a base;
   a webbing take-up reel supported rotatably on the base, carrying a webbing wound up releasably thereon, and biased in the webbing winding direction;
   lock means displaceable between a first state, in which said lock means permits rotation of the take-up reel in the webbing releasing direction, and a second state in which upon detection of a speed change of a predetermined value or greater applied to the base, said lock means prevents rotation of the take-up reel in the webbing releasing direction;
   detection means for determining whether the webbing is worn by an occupant or not, said detection means including means for sensing whether a tang attached to the webbing is latched in its associated buckle, said detection means outputting an output signal for a pre-determined period of time whenever the tang is latched with the buckle and whenever the tang is unlatched from the buckle; and
   latch-preventing means for receiving the output signal from the detection means and for holding said lock means in the first state while said detection means detects that the webbing is not worn by the occupant.

2. An emergency lock retractor as claimed in claim 1, wherein the detection means has a switch actuated upon latching or unlatching of the tang on the buckle and a timer means actuated by an input signal from the switch to generate the signal for a pre-determined period of time.

3. An emergency lock retractor as claimed in claim 2, wherein the switch has a first terminal to which a switching lever of the switch is connected while the tang and buckle are latched and a second terminal to which the switching lever is connected while the tang and buckle are unlatched, and the timer means comprises a first and a second timer connected to the first and second terminals respectively.

4. An emergency lock retractor as claimed in claim 3, wherein both of the timers are actuated at the rise time of the input signal.

5. An emergency lock retractor as claimed in claim 3, wherein both of the timers are actuated at the fall time of the input signal.

6. An emergency lock retractor as claimed in claim 2, additionally comprising a circuit interposed between the switch and the timer means which detects the rise time or fall time of the input singal.

7. An emergency lock retractor as claimed in claim 6, wherein the circuit generates one pulse at each of the rise time and fall time and the timer means is actuated at the rise or fall time of the pulse.

8. An emergency lock retractor as claimed in claim 2, wherein said latch-preventing means includes a solenoid energized or de-energized for a pre-determined period of time by the output signal from said detection means, a period of time by the plunger actuated by the solenoid, and a latch-preventing member displaceable between a first position where said latch-preventing member engages a part of said lock means to hold said lock means in the first state and a second position where said latch-preventing member is maintained out of engagement with said lock means, said latch-preventing member being selectively brought to the first and second positions respectively upon actuation of the plunger owing to the unlatching and latching of the tang.

9. An emergency lock retractor as claimed in claim 8, wherein the latch-preventing means additionally includes a solenoid energizing means for actuating the solenoid by the output signal from the detection means.

10. An emergency lock retractor as claimed in claim 9, wherein the solenoid energizing means is a transistor.

11. An emergency lock retractor as claimed in claim 1, wherein said latch-preventing means includes a solenoid energized or de-energized for a pre-determined period of time by the output signal from said detection means, a plunger actuated by the solenoid, and a latch-preventing member displaceable between a first position where said latch-preventing member engages a part of said lock means to hold said lock means in the first state and a second position where said latch-preventing member is maintained out of engagement with said lock means, said latch-preventing member being selectively brought to the first and second positions respectively upon actuation of the plunger owing to the unlatching and latching of the tang.

12. An emergency lock retractor as claimed in claim 8, wherein a click is formed on the plunger, and said latch preventing means further comprises a cam having an elliptical cam portion and a plurality of teeth engageable with the click and adapted to rotate the cam portion by 90 degrees upon actuation of the plunger, said latch-preventing member being in contact with the cam portion of the cam.

13. An emergency lock retractor as claimed in claim 11, wherein a click is formed on the plunger, and said latch preventing means further comprises a cam having an elliptical cam portion and a plurality of teeth engageable with the click and adapted to rotate the cam portion by 90 degrees upon actuation of the plunger, said latch-preventing member being in contact with the cam portion of the cam.

* * * * *